United States Patent Office 3,531,241
Patented Sept. 29, 1970

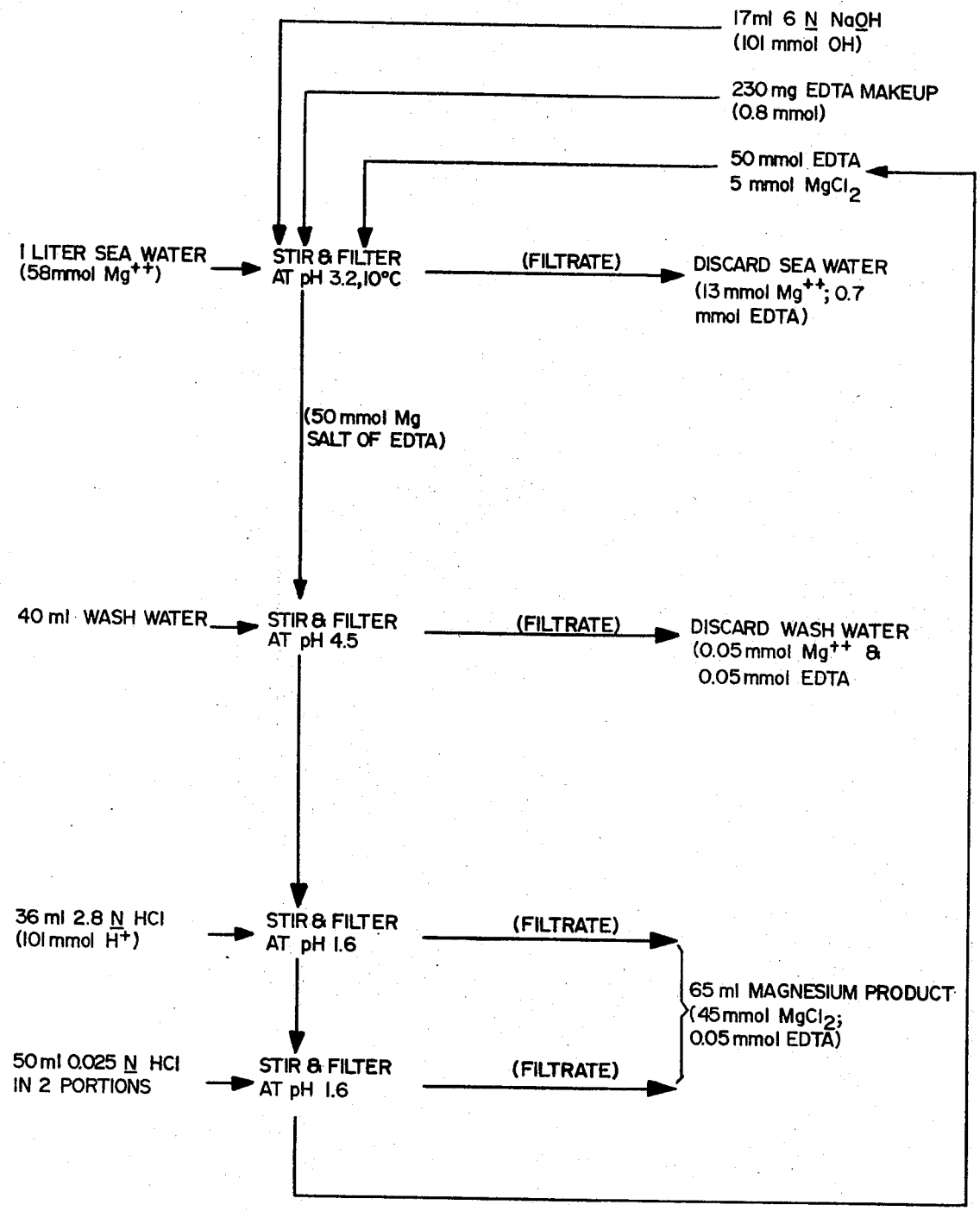

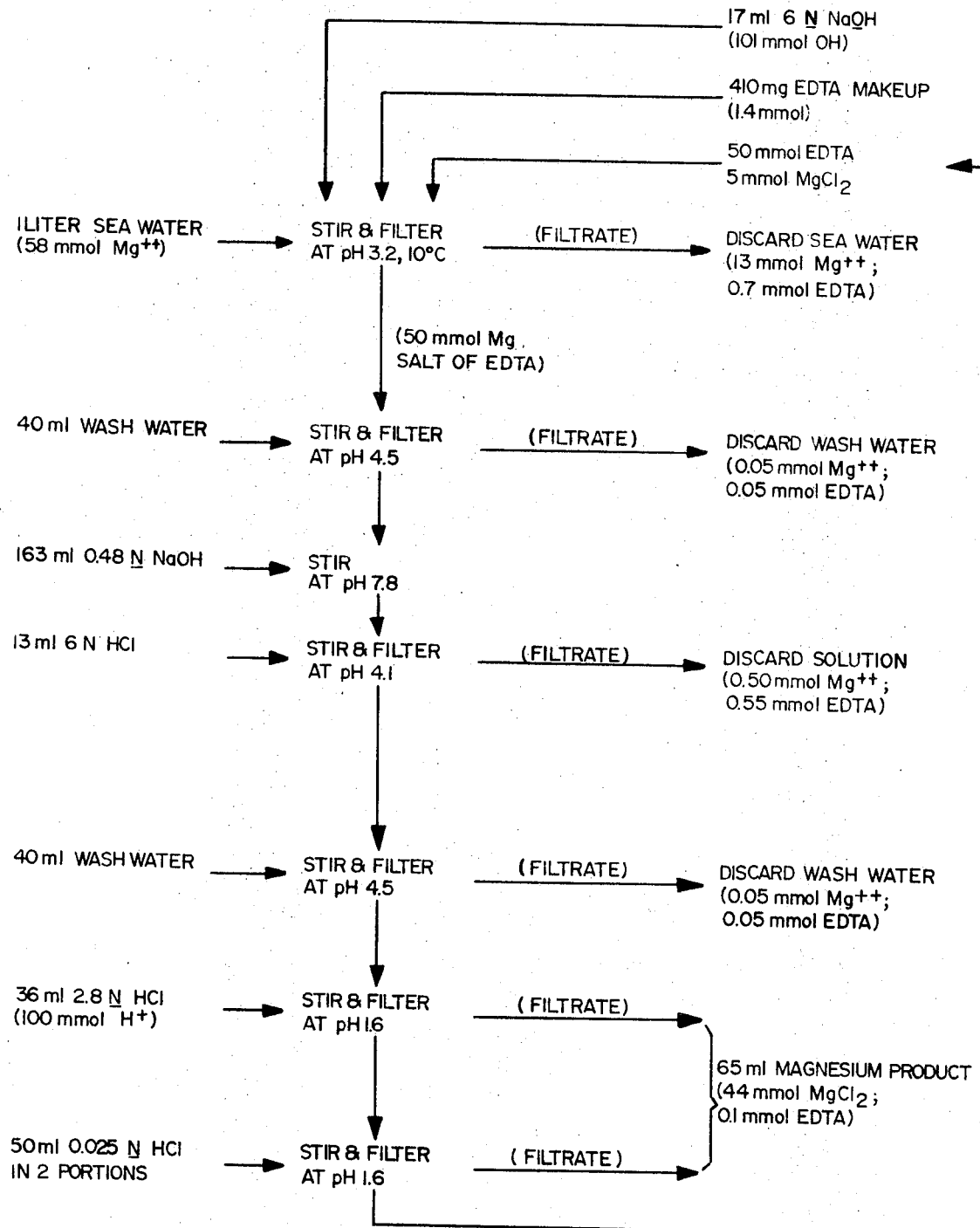

3,531,241
MAGNESIUM RECOVERY FROM SEA WATER
Charles R. Porter, 1251 Avondale, Montgomery, Ala. 36109, and Bernd Kahn, 2621 Briarcliffe Ave., Cincinnati, Ohio 45212
Filed Oct. 23, 1968, Ser. No. 770,014
Int. Cl. C01f 5/00, 5/30, 5/38
U.S. Cl. 23—91      10 Claims

ABSTRACT OF THE DISCLOSURE

This invention relates to a method of recovering magnesium from sea water and provides an improved method of treating sea water and similar brines with EDTA at about pH 3.2±0.2 and separating the magnesium salt precipitate therefrom and subsequently adjusting to a more acid of pH of about 1.6±0.3 with HCl to solubilize the magnesium as magnesium chloride in more concentrated aqueous solution, while crystallizing the EDTA component and reducing substantially the amounts of other constituents normally found in such brines. Alternatively, other mineral acids providing soluble anions may be used vice HCl such as $HNO_3$, etc.

---

The separation and recovery of convenient magnesium values from sea water has acute scientific and commercial interest to both the application of desalination or provision of drinking and agricultural water and for the provision of magnesium values for utilization for aircraft and space vessels.

The most pertinent literature references relating to the magnesium salt of ethylenedinitrilotetraacetic acid are as follows: G. Brunisholz, Chima 11, 363 (1957); C. E. Bricker and G. H. Parker, Anal. Chem. 29, 1470 (1957).

In its relationship to desalination or the recovery of salts from sea water. Butt et al. have described a procedure for the recovery of potassium values using a different chelating or complexing agent. J. B. Butt et al. Chem. Eng. Progress 60 (No. 11), 50 (November 1964).

A teaching of the artificial sea water utilized in the research and testing of the present invention is taught in an article by Kester et al., Limnology and Oceanography 12, 176 (1967).

The following patent art is of general interest: U.S. 2,409,861—Hunter et al., U.S. 2,709,178—Schläpfer, 2,802,788—Flaxman.

The process of the invention consists of (1) precipitating in sea water or brines, at the appropriate pH value, the magnesium salt of a weak acid and thus separating the magnesium from the other constituents of sea water; and then (2) dissolving the magnesium salt of the weak acid in a stronger acid to recover a soluble magnesium salt, while simultaneously crystallizing the weak acid for reuse. The weak acid utilized in this invention to recover magnesium was ethylenedinitrilotetraacetic acid, commonly abbreviated EDTA, whose formula may be written as $(CH_2)_2N_2(CH_2COOH)_4$.

As utilized in the appended claims, the term "mineral acid" is used to designate mineral acids which form soluble magnesium salts in water such as HCl, $HNO_3$, etc.

A pH value of about 3.2±0.2 is used for precipitating the magnesium salt of EDTA in sea water, and a preferred pH value of about 1.6±0.3 and operable value of about 1.0 to 1.9 is used for crystallizing EDTA in a solution of magnesium chloride and dilute mineral acid, preferably hydrochloric acid. A vital part of the invention is the selection of the EDTA weak acid that forms an insoluble magnesium salt but a soluble calcium salt in water, and is very insoluble in a dilute solution of a strong mineral acid. The principle of using a weak acid in this manner has been described for the recovery of potassium from sea water by Butt et al., supra, but the earlier work cannot be applied to magnesium rceovery, utilizes another acid, and is performed under different conditions.

Two immediate applications of the invention are:
(1) The preparation of a magnesium salt that is free of most other substances in sea water for use in manufacturing magnesium metal, and
(2) The preparation of a pure magnesium salt, such as magnesium chloride, for direct use as chemical reagent.

Low cost and simplicity are required for the first application, hence the only treatment between steps (1) and (2) consists of washing the magnesium salt of EDTA with water at about pH 4.5±0.2. For the second application, high purity is important, hence the magnesium salt of EDTA is washed with water, dissolved in water at the pH value of 7.8, reprecipitated in water at the pH value of about 4.1, and washed again with water. The process may be performed in a single vessel suitable for mixing and filtering both the amount required for step (1) and the substantially smaller amounts for step (2). The chemical reagents needed for the process consist of:
(1) EDTA or a suitable salt of EDTA (for example, the sodium or potassium salts of EDTA);
(2) A base such as sodium hydroxide and an acid such as the preferred hydrochloric acid to adjust pH values. Other acids may be used to obtain alternative anionic forms of the magnesium product where desired and where the salt formed is soluble in water.

The efficacy of the process increases with an increase in the ratio of magnesium recovery to EDTA loss. This is affected by the following variables:

*pH value.*—The minimum solubility of the magnesium salt of EDTA in sea water of the composition was observed to be at pH values between 3.0 and 3.5. The minimum solubility of EDTA in dilute hydrochloric acid was observed to be between pH values of 1.0 and 1.9, and confirms the literature reported optimum minimum at the pH value of 1.6.

*Tempertaure.*—The solubility in sea water of the magnesium salt of EDTA decreased as the temperature was lowered.

The solubility of EDTA at the pH value of 1.6 was almost constant between 10° C. and 18° C. and slightly higher at 25° C.

*Mixing period.*—The insoluble magnesium salt of EDTA was observed to form slowly at the temperatures of interest and solubility reached a minimum value after approximately 19 hours and then remained constant at this value.

Crystallization of EDTA at pH values near 1.6 reached a constant value within one hour.

*Salt content of water.*—The solubility of the magnesium salt of EDTA was observed to be greater in sea water than in distilled water. In addition, the pH value at which the minimum in solubility occurred was observed to be near 3.2 in sea water, compared to pH values near 4.0 reported for distilled water. These factors permitted the aqueous washing steps to go with overall process efficiency.

The recovery portion of the invention can be described by Example 1 and the accompanying FIG. 1 which gives values for magnesium and EDTA in the example. This procedure is designed for a higher ratio of magnesium recovery to EDTA loss. The example presents one cycle of the process in which successive 1-liter batches of sea water are treated with the same portion of EDTA. The composition of the sea water source is shown in Table 1, the composition of the product in Table 2. Values in FIG. 1 are averages from seven consecutive cycles according to Example 1 below.

TABLE 1.—COMPOSITION OF SAMPLE OF WATER FROM ATLANTIC OCEAN AND SYNTHETIC SEA WATER USED TO TEST PROCESS, G./KG.

| Substance | Atlantic Ocean [1] | Synthetic [2] |
|---|---|---|
| $Cl^-$ | 20.9 | 19.35 |
| $Na^+$ | 11.8 | 10.76 |
| $SO_4^{--}$ | 2.5 | 2.71 |
| $Mg^{++}$ | 1.41 | 1.30 |
| $Ca^{++}$ | 0.43 | 0.41 |
| $K^+$ | 0.42 | 0.39 |
| $HCO_3^-$ | | 0.14 |
| $Br^-$ | | 0.066 |
| $Sr^{++}$ | 0.006 | 0.008 |
| $H_3BO_3$ | | 0.026 |
| $F^-$ | | 0.001 |

[1] Analysis of water collected at Cape Kennedy, Fla., on Oct. 25, 1967.
[2] Prepared according to Kester et al., supra.

TABLE 2.—ANALYSIS OF MAGNESIUM PRODUCT PER LITER SEA WATER [1]

| Substance | Concentration in product, g/liter | Amount, g. | Yield, percent |
|---|---|---|---|
| $Mg^{++}$ | 16.4 | 1.07 | 76 |
| $Cl^-$ | 48 | 3.13 | 15 |
| $Na^+$ | 0.22 | 0.014 | 0.13 |
| $SO_4^{--}$ | 0.028 | 0.0018 | 0.07 |
| $Ca^{++}$ | 0.29 | 0.019 | 4.4 |
| $K^+$ | 0.0056 | 0.00036 | 0.09 |
| $Sr^{++}$ | 0.00046 | 0.000030 | 0.5 |
| $H_3BO_3$ | <0.0012 | <0.00008 | <0.4 |

[1] Magnesium product prepared according to Example 1.

EXAMPLE 1

Recovery of Mg salt from sea water (1) 1 liter of sea water (cf. FIG. 1), 0.8 millimole EDTA, and 17 ml. 6 N sodium hydroxide were added to a vessel containing 50 millimoles EDTA and 5 millimoles magnesium chloride recovered from a previous cycle. The solution was stirred for 19 hours at 10° C. Acid or base was added, as necessary, to adjust the pH value between 3.0 and 3.5. The solution was filtered, and the sea water filtrate discarded.

(2) 40 ml. of wash water at a pH value of 4.5 were added to the vessel and the mixture was stirred at ambient temperature (22° C.) for 10 minutes. The solution was filtered and the filtrate discarded.

(3) 36 ml. 2.8 N hydrochloric acid were added to the vessel and the mixture was stirred at ambient temperature for 1 hour. The pH value was adjusted with acid or base as necessary to maintain it in the range pH 1.0 to 1.9. The solution was filtered and the filtrate containing the magnesium chloride product was collected.

(4) 25 ml. of 0.025 N hydrochloric acid were added to the vessel as acid wash and the mixture was stirred at ambient temperature for 10 minutes. The solution was filtered and the filtrate added to the magnesium chloride product.

(5) Step. (4) was repeated. The crystalline insoluble EDTA and any residual magnesium chloride remain in the vessel for recovering magnesium values from the next batch of sea water.

The purification portion of the invention is shown by Example 2 and its accompanying FIG. 2. This procedure is designed to yield a magnesium product of greater purity especially with regard to calcium and sodium contamination. However, it has a lower ratio of magnesium recovery to EDTA loss, requires more acid and base, and is more lengthy. The composition of the product is described in Table 3.

TABLE 3.—IMPURITIES IN MAGNESIUM PRODUCED FROM SEA WATER [1]

| Substance: | Concentration, milligram/gram magnesium |
|---|---|
| EDTA | 20 |
| $Na^+$ | 13 |
| $SO_4^{--}$ | 0.3 |
| $Ca^{++}$ | 1.1 |
| $K^+$ | 0.02 |
| $Sr^{++}$ | <0.01 |
| $H_3BO_3$ | <0.1 |

[1] Magnesium product prepared according to Example 2.

EXAMPLE 2

Recovery of magnesium salts of increased purity (cf. FIG. 2)

(1) 1 liter of sea water, 1.4 millimole EDTA, and 17 ml. 6 N sodium hydroxide were added to a vessel containing 50 millimoles EDTA and 5 millimoles magnesium chloride from a previous cycle. The solution was stirred for 19 hours at 10° C. Acid or base was added as necessary to maintain the pH value between 3.0 and 3.5. The solution was filtered, and sea water filtrate discarded.

(2) 40 ml. of wash water at a pH value of 4.5 were added to the vessel and the mixture was stirred at ambient temperature (22° C.) for 10 minutes. The solution was filtered and the filtrate discarded.

(2a) 150 ml. of water and 13 ml. 6 N sodium hydroxide were added to the vessel and the mixture was stirred at ambient temperature for 10 minutes to dissolve the magnesium salt of EDTA. Base or acid was added to maintain the pH value between 7.6 and 8.0.

(2b) 13 ml. of 6 N hydrochloric acid were added to the vessel and the mixture was stirred at ambient temperature for 4 hours. Base or acid was added to adjust the pH value to between 3.8 and 4.4. The solution was filtered and the filtrate discarded.

(2c) Step (2) was repeated.

(3) 36 ml. 2.8 N hydrochloric acid were added to the vessel and the mixture was stirred at ambient temperature for 1 hour. The pH value was adjusted with acid or base as necessary to maintain it in the range 1.0 to 1.9. The solution was filtered and the filtrate containing magnesium chloride product was collected.

(4) 25 ml. of 0.025 N hydrochloric acid were added to the vessel and the mixture stirred at ambient temperature for 10 minutes. The solution was filtered and the filtrate added to the magnesium chloride product.

(5) Step (4) was repeated. The crystalline EDTA and residual magnesium chloride remained in the vessel for recovering magnesium from the next batch of sea water.

The process in the examples may also be performed continuously by alternative apparatus.

The embodiments of the invention in which an exclusive property or privilege is claimed are defined as follows:

1. In a method of treating sea water to recover magnesium salts therefrom with substantially reduced impurities, the steps comprising:

treating sea water with ethylenedinitrilotetraacetic acid (EDTA) at a pH value of about 3.2±0.2 for a mixing period of up to about 19 hours to form the insoluble magnesium (Mg) salt of EDTA and separating said insoluble Mg salt from sea water;

washing the insoluble Mg salt with water at a pH value of about 4.5±0.2;

treating said insoluble Mg salt with a mineral acid at a pH value of about 1.0 to 1.9 to crystallize EDTA as a precipitate and to form a soluble magnesium salt;

separating the magnesium salt product from the EDTA.

2. The method according to claim 1 wherein the EDTA byproduct is additionally washed with a mineral acid at a pH value of about 1.0 to 1.9 to produce a magnesium filtrate wash solution and combining said magnesium wash solution with the magnesium salt product to recover an aqueous magnesium salt product solution in concentrated form.

3. The method according to claim 1 wherein the mineral acid is utilized at a pH value of about 1.6±0.3.

4. The method according to claim 1 wherein the EDTA precipitate is recycled in a continuous manner to serve again as reactant in the process.

5. The method according to claim 1 wherein the mineral acid is HCl.

6. In a method of treating sea water to recover magnesium salts therefrom with a high degree of purity, the steps which comprise:
    treating sea water with EDTA at a pH value of about 3.2±0.2 for a mixing period of up to about 19 hours to form the insoluble magnesium (Mg) salt of EDTA;
    separating the insoluble salt from sea water;
    washing the insoluble Mg salt with water at a pH value of about 4.5;
    dissolving the Mg salt of EDTA in water at a pH value of about 7.8;
    reprecipitating the magnesium salt of EDTA in water at a pH value of about 4.1;
    washing the insoluble EDTA salt in water at a pH value of about 4.5;
    treating the insoluble EDTA salt with a mineral acid at a pH value of about 1.0 to 1.9 to crystallize EDTA as a precipitate and to form a soluble magnesium product;
    separating the magnesium salt product from the EDTA.

7. The method according to claim 6 wherein the mineral acid is utilized at a pH value of about 1.6±0.3.

8. The method according to claim 6 which comprises additionally washing the crystalline EDTA with a mineral acid at a pH value of about 1.6±0.3 to produce a magnesium filtrate wash solution and combining said magnesium wash solution with the magnesium product to recover an aqueous magnesium salt product solution in concentrated form.

9. The method according to claim 6 wherein the EDTA precipitate is recycled in a continuous manner to serve again as reactant in the process.

10. The method according to claim 6 wherein the mineral acid is HCl.

References Cited

Analytical Chem., vol. 29, No. 10, October 1957, pp. 1470–1474.

EDWARD STERN, Primary Examiner

U.S. Cl. X.R.

23—50, 102, 128